United States Patent [19]
Baker et al.

[11] Patent Number: 5,682,528
[45] Date of Patent: Oct. 28, 1997

[54] SPOON-FEED INITIALIZATION IN A MULTIPROCESSOR SYSTEM

[75] Inventors: William E. Baker; David P. Sonnier, both of Austin; Daniel L. Fowler, Georgetown; Frank A. Williams, Austin, all of Tex.

[73] Assignee: Tandem Computers Incorporated, Cupertino, Calif.

[21] Appl. No.: 578,889

[22] Filed: Dec. 22, 1995

[51] Int. Cl.$^6$ ........................................................ G06F 9/00
[52] U.S. Cl. ........................................................ 395/651
[58] Field of Search ........................................ 395/651, 652, 395/712, 708, 709, 653

[56] References Cited

U.S. PATENT DOCUMENTS

| | | | |
|---|---|---|---|
| 4,701,847 | 10/1987 | Nichols | 395/651 |
| 5,257,387 | 10/1993 | Richek et al. | 395/651 |
| 5,388,267 | 2/1995 | Chan et al. | 395/652 |
| 5,398,333 | 3/1995 | Schieve et al. | 395/652 |
| 5,432,941 | 7/1995 | Crick et al. | 395/651 |
| 5,555,411 | 9/1996 | England et al. | 395/652 |

*Primary Examiner*—Kevin A. Kriess
*Attorney, Agent, or Firm*—Townsend and Townsend and Crew

[57] ABSTRACT

The present invention provides a mechanism for initial execution of software code by a processor in a multiprocessor system. In the preferred embodiment, the multiprocessor system has registers implemented at a reset vector location in a processor. The registers are first loaded with a sequence of software code, and then a first instruction loop is implemented with that software code. The processor is then released from a reset state, and the first instruction loop is executed. This first instruction loop is capable of being executed for an indefinite length of time, and it can execute software instructions on a periodic basis. The first instruction loop is then modified into a second instruction loop. The first and second instruction loops have at least one different instruction. The processor within the system of multiple processors is thus initialized.

12 Claims, 3 Drawing Sheets

SPOON-FEED INITIALIZATION IN A MULTIPROCESSOR SYSTEM

BACKGROUND OF THE INVENTION

The present invention is directed generally to a method of executing software code in a processor, and more particularly to a mechanism for initial execution of code by a processor in a multiprocessor system.

CPU initialization is one part of a much larger process of initializing a multiprocessor system. Initializing a processor in a multiprocessor system is often done by running a software program which is stored in a read only memory (ROM) or a flash memory. In this arrangement, a separate data path on the central processing unit (CPU) board for ROM or Flash memory is needed. These devices typically run much slower than a dynamic random-access memory (DRAM). Additionally, mixing memories of two speeds adds complexity to the CPU design. Overall, the traditional ROM or flash memory implementations require additional hardware and additional memory data path logic. This hardware and logic adds cost and complexity to the traditional design. In ROM or flash based designs, software storage is replicated for each processor which further increases cost and adds complexity to the updating of the software.

Thus, it is desirable to store the initialization software in one place for use by many CPUs without having to extend the memory data path beyond the CPU. This leads to easier updating of the software since it does not have to be updated multiple times. By storing the initialization software in a resource that does not depend on reading this software for its own execution, the software can be stored and updated using methods and devices common to the storage of other configuration information. By utilizing less hardware in the initialization state, the initialization software can configure more of the hardware, thereby removing some of the hardware complexity. In summary, it is desirable to have a mechanism for initialization which pushes data and software code from a service processor to another processor so that an additional memory area is not needed for the initialization process. This arrangement requires less hardware to implement and therefore is less expensive and less complex.

SUMMARY OF THE INVENTION

The present invention provides a mechanism for initial execution of software code by a processor in a multiprocessor system. Moreover, The present invention provides a mechanism which allows a system of multiple processors to be initialized with a single, centrally managed copy of initial software code images.

In the preferred embodiment, the multiprocessor system has registers implemented at a reset vector location in a processor. The registers are first loaded with a sequence of software code, and then an instruction loop is implemented with that software code. The processor is then released from a reset state, and the instruction loop is executed. This instruction loop is capable of being executed for an indefinite length of time, and it can execute software instructions on a periodic basis. The instruction loop is then modified into a new instruction loop. The original and the new instruction loops have at least one different instruction. The processor within the system of multiple processors is thus initialized.

Further aspects and features of the present invention will become evident to those skilled in this art on a reading of the following detailed description of the invention, which should be taken in conjunction with the accompanying drawings.

DESCRIPTION OF THE PREFERRED EMBODIMENT

The present invention provides a mechanism which allows a processor in a system of multiple processors to be initialized with a single, centrally managed copy of initial software code images. In the preferred embodiment, the multiprocessor system of the present invention contains no processor readable nonvolatile memory. Therefore, to enable this initialization, an on-line access port (OLAP) and a specialized communications network access is used to push data and software code from a service processor (SP) to another processor or central processing unit (CPU) in the multiprocessing system.

In the preferred embodiment, the spoon-feed operation consists of two interrelated processes executing on two separate processors. For example, one process can be labeled the loader and the other the target. In this arrangement, the goal of spoon-feeding is to control the operation of the target. This is accomplished by the loader issuing commands to the target. These commands are in the form of microprocessor opcodes. In the preferred embodiment of the multiprocessor system, the CPU board (also referred to as the processor) executes the target and the service processor (SP) executes the loader. The multiple processor system has multiple CPU boards and multiple SPs. To spoon-feed, one SP and one CPU board in the multiprocessor system are paired. To simplify, parts of this disclosure may only consider the existence of one target (CPU board) and one loader (service processor). While the present invention can exist with only one target and one loader, the present invention can also exist in large multiprocessor systems with multiple targets and multiple loaders. For example, multiple spoon-feeding operations can be occurring at the same time, but operating as independent processes.

Figure 1:
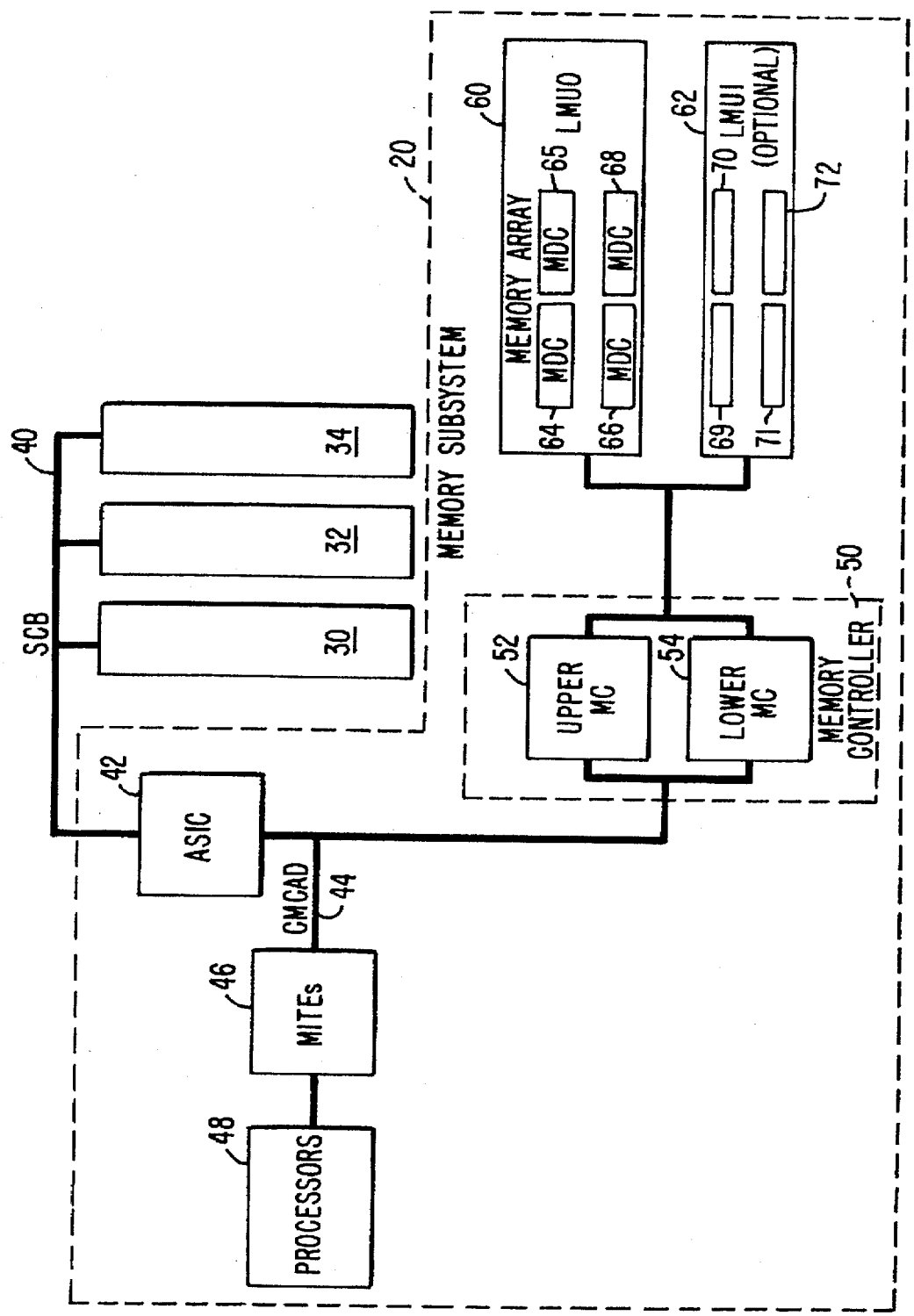
FIG. 1 is an overview block diagram of components associated with a memory data path in a multiprocessor system.

As stated above, CPU initialization is one part of a much larger process of initializing a multiprocessor system. FIG. 1 is an overview block diagram of components associates with a memory data path in a multiprocessor system. FIG. 1 provides an overall environment for the present invention. In the preferred embodiments, memory subsystem 20 is connected to other processors 30, 32, and 34 via system coherent bus (SCB) 40. After all the individual CPU boards are initialized in isolation, this SCB is enabled and used to transfer data between the CPUs. Application specific integrated circuit (ASIC) 42 interfaces with the CPU board and SCB 40. ASIC 42 also implements large portions of the cache coherency protocols. Coherent memory controller address and data bus (CMCAD) 44 connects microprocessor interface ASIC (MITEs) 46, memory controller (MC) 50 and ASIC 42. MITEs 46 are processors' 48 path to memory subsystem 20. Processors 48 can be, for example, MIPs R4400 processors. In the preferred embodiment, both upper MC 52 and lower MC 54 are contained within MC 50. MC 50 can be coupled to memory arrays 60 and 62. Logical memory unit 0 (LMU0) and logical memory unit 1 (LMU1) consist of eight memory daughter cards 64–72 (four daughter cards in each logical memory unit). Memory expansions can be done by adding more logical memory units.

The present invention has several architectural elements. For example, the target microprocessor reset vector is a location in the target microprocessor's address space. After a start-up or reset, the first opcode is read from this reset vector location. By extension, the first opcode can include the locations immediately following the reset vector location. The value read by the microprocessor when the reset vector is addressed can be changed by the loader prior to and during target microprocessor execution. Thus, the opcode fetched by the target from this reset vector location can be changed. In the preferred embodiment, the target processor reset vector is implemented as processor readable registers in the MC ASICs (see FIG. 1).

Figure 2:
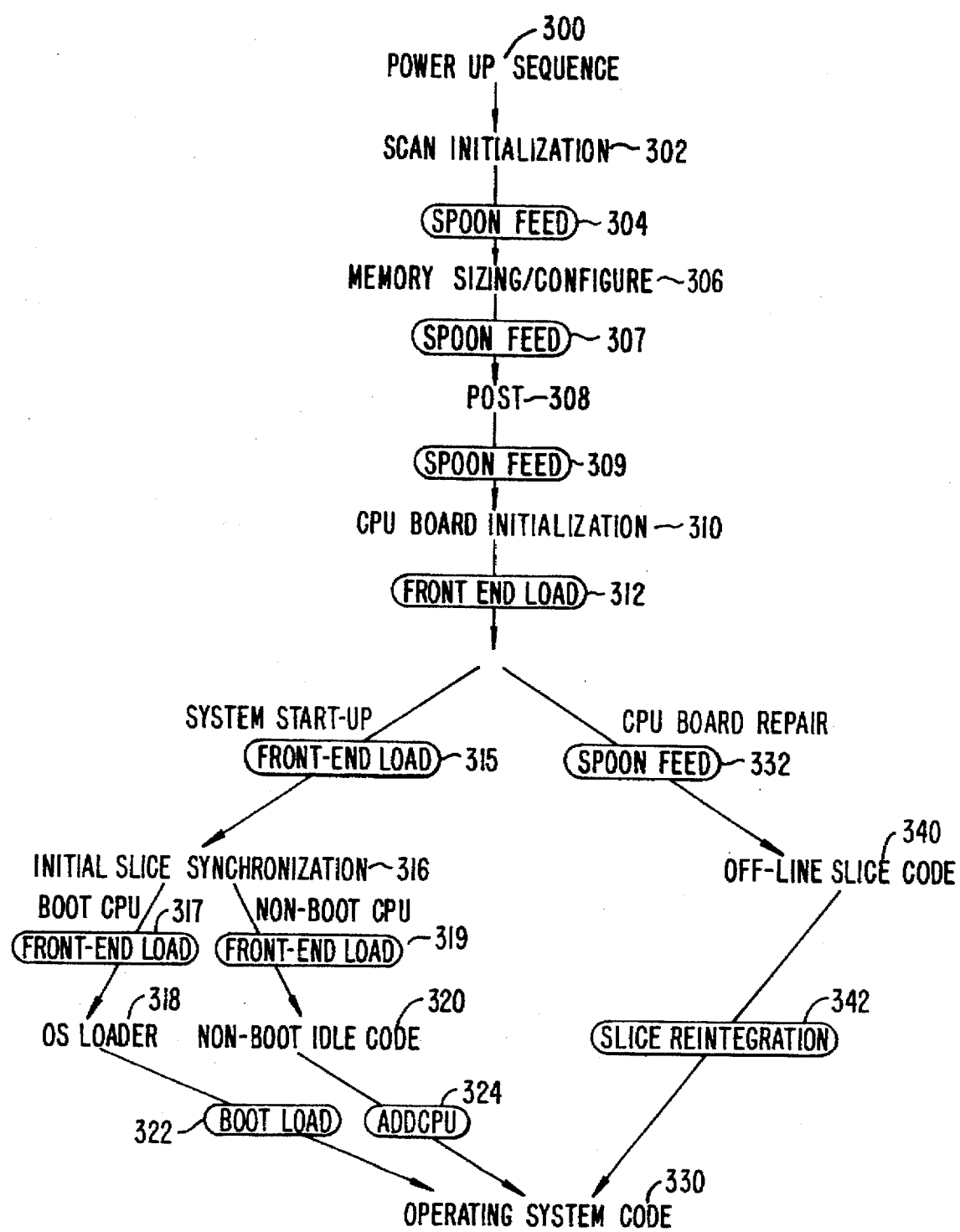
FIG. 2 is a process flow diagram for central processing unit (CPU) board start-up.

FIG. 2 is a process flow diagram for central processing unit (CPU) board start-up. CPU boards start up in one of two primary modes, start-up and repair. In the start-up mode, the system is not running; in repair mode, the system is running. FIG. 2 provides a graphical overview of the start-up and the repair processes. At step 300, the power-up sequence begins. The service processor (SP) initializes the CPU board's ASICs using scan initialization and on-line access port (OLAP) cycles at step 302. The OLAP allows the target's reset vector to be changed by the loader. In the preferred embodiment, each ASIC has an OLAP, and the target processor can issue commands to the OLAP to read or write registers on the ASIC. At step 304, a spoon-feed occurs to bring the process to step 306. At step 306, the array is sized and configured. A memory sizer is a spoon-feed sequence which determines the size and configuration of the CPU board's DRAMs. A spoon-feed at step 307 loads the power-on self-test (POST) at step 308. In the preferred embodiment, the POST is only ran after the memory has been configured. Once the CPU board has passed the POST, another spoon-feed at step 309 loads the CPU board initialization. At step 310, the CPU board initialization process initializes the processors 48 (see FIG. 1), caches and memory. After performing various other functions, the CPU board initialization step 310 ends and the front-end loader idle loop 312 begins. The bulk of CPU initialization is performed by the CPU board initialization object code at step 310. This code initializes the CPU registers, caches, and the like. It also writes 0s to memory locations to initialize memory codes. The CPU board initialization step signals its completion by doing a write to a MC register location. The SP reads this MC register location until it detects a value indicating completion of the CPU board initialization step. Loaders are used to push code and/or data from the SP to the CPU board.

If the system is already running, this is a repair option. If the system is not running, the SP loads code in all of the CPUs on a processor slice. When this is completed, all CPUs located in the processor slice are enabled on the SCB. For the system start-up mode, the initial slice synchronization code is front-end loaded to all CPU boards at step 315. At step 316, the two processor slices of a duplex system are synchronized by the object code in the initial processor slice synchronizer. Step 316 signals its completion by doing a write to a MC register location. The SP reads this MC register location until it detects a value indicating completion of the initial processor slice synchronizing. If a boot CPU occurs next, a front-end loader at step 317 loads the operating system (OS) loader at step 318. If a non-boot CPU occurs, another front-end loader at step 319 loads the non-boot idle code at step 320. Finally, either boot load at step 322 or addcpu at step 324 is used to load the operating system code at step 330.

In the preferred embodiment, the OS loader at step 318 is pushed via the front-end loader at step 317 to CPU0's memory, and then executed. Thus, the code that loads the operating system from the boot media (OS loader) is loaded. The OS loader can contain, for example, a SCSI device driver, software code associated with a disc layout, the boot file system and various object files. The OS loader is driven by a parameter block which is front-end loaded by the SP when the OS loader is pushed to CPU memory. The OS loader also uses a system configuration table which has been front-end loaded into memory.

For the system's repair mode, spoon-feeding is used at step 332 to load the off-line slice code at step 340. At step 342, slice reintegration is used to load the operating system code at step 330. In the preferred embodiment, spoon-feeding is used to push code to the CPU board. Spoon-feeding can be used, for example, at steps 304, 307, 309 and 332 in FIG. 2. At steps 307 and 309, a special case of spoon-feeding is utilized. In this special case, the memory is initialized to hold a code image that can be later executed by the CPU.

If a CPU board is initialized while the system in running (i.e., when a repair operation is being performed), the spoon-feed idle loop is used by writing nop code to the MC registers and vectoring the processor back to the reset vector location. Slice reintegration at step 342 is then used to move to the operating system code at step 330.

To provide spoon-feeding, hardware registers are implemented at a reset vector location of a CPU board's microprocessor. As stated above, this is the location where the microprocessor will fetch the first instructions after reset. In the preferred embodiment, the registers are readable by the microprocessor and writable by an external processor (e.g., the SP). All registers can be spread across upper MC 52 and lower MC 54 (see FIG. 1). For most of the registers, the data values written into the upper MC register are respectfully equal to the data values written in the corresponding lower MC register. The exception vectors are general purpose registers which are programmed with software for cold start, warm start, low level booting and loading of programs. In general, the exception vectors in upper MC 52 are loaded with different instructions/data values then those in the exception vectors in lower MC 54. The status registers in both MCs can be identical in function, but they may return different values if one MC detects a failure that is not detected by another MC. For example, a cross check error can occur in only one of the MCs. The history registers capture the recent history of data and control in the MCs. The information in the history registers can be perused for fault analysis. In the preferred embodiment, each MC obtains two 32-bit exception vector registers and one parameter passing register (either an even or an odd parameter register). The processor can read and write an even parameter register, but the OLAP can only read it. Similarly, the OLAP can read and write an odd parameter register, but the processor can only read it. MCs on the CPU board are called even and odd to refer to which addresses they decode.

Prior to releasing the target microprocessor from a reset state, the hardware registers are loaded with a simple sequence of code that implements a software loop. In the preferred embodiment, the loader write values to the reset vector location to implement this short software loop. Thus, the software loop is contained in the hardware registers which are implemented at the reset vector location. In the case of the MIPs microprocessors, the loop is composed of the following four R4400 opcodes:

```
1: nop
   nop
   b 1b
   nop
``` nop is the no-operation opcode. This opcode advances the program counter and does not affect the remaining registers of the microprocessor. b 1b is a branch opcode with the target being the instruction two opcodes prior to the branch (in this case the first nop in the software loop). The design of the R4400 microprocessor is such that the opcode following all branches is executed.

Figure 3:
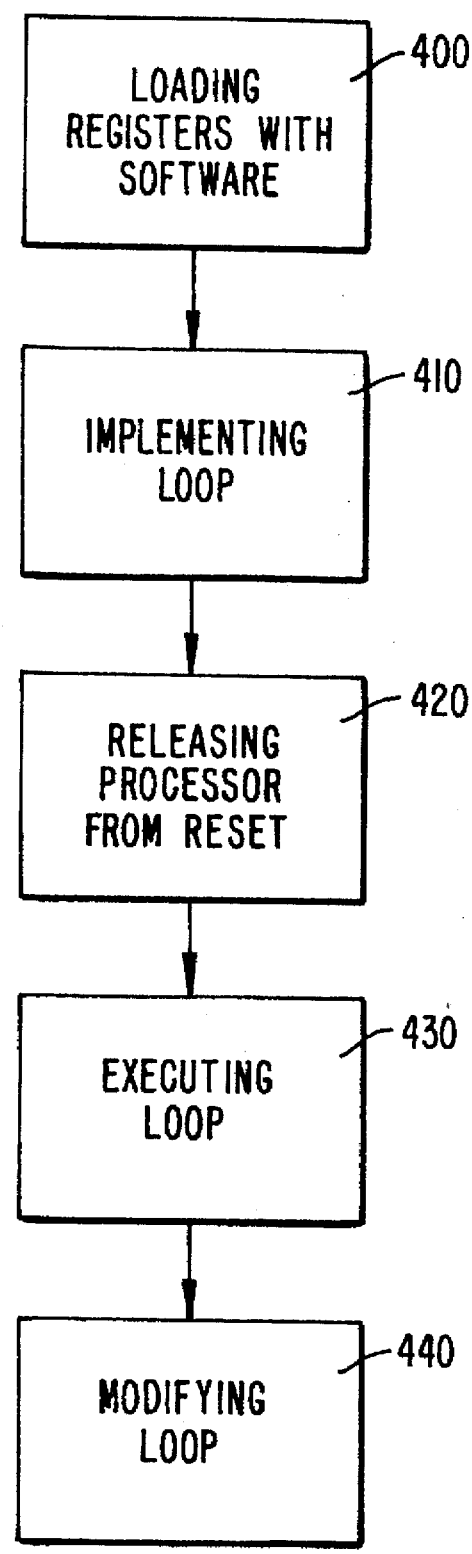
FIG. 3 is an overview of the process flow for spoon-feeding in a multiprocessor system.

FIG. 3 is an overview of the process flow for spoon-feeding in a multiprocessor system. At step 400, the reset vector location is loaded with software code. At step 410, this software code is used to implement the above-described loop. At step 420, the microprocessor is removed from the reset state. At step 430, the microprocessor executes the loop. To execute the loop, the microprocessor begins by fetching the first opcode (nop) and then the second opcode (nop) and then the third opcode (b 1b) and then the fourth opcode (nop). At this time the branch opcode (b 1b) takes effect and the microprocessor fetches the next opcode from the beginning the software loop. Again, the R4400 microprocessor causes the one opcode delay in the execution of the branch opcode. In an alternative embodiment, the microprocessor executes branches immediately and does not fetch the fourth opcode in this loop. In the preferred embodiment, the microprocessor continues executing these instructions until the microprocessor is stopped (e.g. during a power down) or one of opcodes in the loop is changed.

The above software loop can be executed for an indefinite length of time, and it executes at least one software instruction on a regular basis (e.g., every cycle of the loop). Once the microprocessor exits the reset state at step 420 and starts executing the spoon-feed idle loop at step 430, the external processor can control the microprocessor by modifying the instructions of this software loop at step 440. Therefore, the loader affects the operation of the target by changing the opcodes in the reset vector location. In the preferred embodiment, only one instruction is modified in the loop. In an alternative embodiment, multiple instructions are changed.

The following description applies to a configuration where only one opcode is changed at a time. While the opcode is changed, the microprocessor is still fetching instructions from the reset vector location and executing them. The OLAP port changes the value of the registers that implement the reset vector. This occurs between instruction fetches so that during updates to the register the microprocessor sees the previous value until the new value is read. From that time until the next update, the new value is read. This arrangement for OLAP writes to registers guarantees that invalid or out of date data are not read.

The microprocessor and the external processor are not synchronized to each other. Therefore, the microprocessor executes instructions at a rate such that all the instructions in the software loop are executed at least one time before they are updated. In one implementation this is achieved because the R4400 processor is fetching instructions 2 to 3 times faster than the OLAP writes. Thus, the instructions are executed many times before being replaced by/modified with new instructions. To keep the execution deterministic, the instructions in the loop are limited to those instructions that produce the same result regardless of the number of times they are executed. For the first example, the following instruction:

```
AND t0, t0, t1
``` places the logic AND of the contents of the registers t0 and t1 into register t0. If this instruction is repeated, the contents of t0 will not change. This is not true for the following instruction:

```
ADD t0, t0, t1
``` which places the integer sum of the contents of registers t0 and t1 into register t0. If this instruction is repeated, the contents of t0 will change (assuming that t1 is non-zero). Using the sequence of instructions included in the first example, complex CPU board initialization can be accomplished. This can include (1) loading arbitrary code sequences into the microprocessor's addressable memory, thereby simulating a code image stored in non-volatile memory, (2) writing values to the microprocessor, ASIC and/or board hardware control registers, and (3) determining the size and configuration of the memory array and setting the associated hardware control registers appropriately (i.e., with a memory sizer).

To further illustrate the present invention, the following sequence of instructions can be placed in a spoon-feed idle loop at the location occupied by the first nop instruction:

```
lui  t0, 0xa000
ori  t0, t0, 0x1000
lui  t1, 0x1234
ori  t1, t1, 0x5678
sw   t1, 0(t0)
```

The above sequence will load the value 0xa0001000 into t0, then load the value 0x12345678 into t1, and finally store the value 0x12345678 at location 0xa0001000. Using sequences such as this, an addressable memory location can be initialized. A branch instruction can then be placed in the loop transferring control out of the spoon-feed idle loop and into the loaded code image. The loaded code images are the software objects that would be stored in ROM or Flash memories in other designs. These loaded code images can include the following: configuration software (memory__sizer), power on self test (POST), board initialization software (cpu__init), and operating system loader (OS Loader). In the preferred embodiment, these loaded code images are stored in the memory of the SP and spoon-feed to the CPU when or as needed.

In the preferred embodiment, the SP can give the processor instructions one at a time by writing them to the MC__EXCO register on the even MC. This replaces the first nop instruction in the spoon-feed initialization loop. The processor instructions passed this way may be executed multiple times because the processor will be executing them faster then the SP can send them. The SP can rely on this multiple execution, and therefore does not need to implement an explicit flow control mechanism.

As stated above, a spoon-feeding can be used to perform writes to memory. For example, the following code writes the two words 0xdeadbeef and 0xfeedface to a double word in memory at location 0x000100040:

```
            lui  t0, 0xdead
            ori  t0, 0xbeef
            dsll t1, t0, 32
            lui  t0, 0xfeed
            ori  t0, 0xface
            dsll t2, t0, 32
            dsrl t2, t0, 32
            or   t0, t1, t2
            lui  t1, 0x8001
            ori  t1, 0x0040
            Sd   t0, 0(t1)
```

Front-end loads performed at steps 312, 315, 317 and 319 in FIG. 2, refer to when the SP uses the network communication system to perform writes to memory. This is done (1) to load large images or (2) to load code once the two processor slices of a duplex system have been synchronized. The loop utilized by the front-end load is a copy of the code that executes during the spoon-feed load.

The following is yet another example of how to use spoon-feeding to initialize a section of memory. In the following configuration, the instructions and registers are those of the MIPs R4400 microprocessor. The R4400 microprocessor is designed to fetch its first opcode from memory address 0xbfc00000. In the preferred embodiment, this address is mapped to the MC_EXCO register in the even MC. The base spoon-feed idle loop instructions are pre-loaded in the exception registers as follows:

```
    EVEN MC:MC_EXC0 bfc00000: nop
    ODD  MC:MC_EXC0 bfc00004: nop
    EVEN MC:MC_EXC1 bfc00008: b 0xbfc00000
    ODD  MC:MC_EXC1 bfc0000c: nop
```

The spoon-feed sequence to load memory instructions are written to the MC_EXCO register in the even MC one at a time as follows:

```
        lui t0, <high 16bits of memory address #1>
        ori t0, <low  16bits of memory address #1>
        lui t1, <high 16bits of data word #1>
        ori t1, <low  16bits of data word #1>
        sw  t1, 0(t0)
        lui t0, <high 16bits of memory address #2>
        etc.
```

Instruction fetches are executed by R4400 microprocessor as follows:

```
        0xbfc00000 nop
        0xbfc00004 nop
        0xbfc00008 b 0xbfc00000
        0xbfc0000c nop
        0xbfc00000 nop
        0xbfc00004 nop
        0xbfc00008 b 0xbfc00000
        0xbfc0000c nop
```

This sequence repeats until the first opcode of the spoon-feed sequence is sent.

```
    0xbfc00000 lui t0,
               <high 16bits of memory address #1>
    0xbfc00004 nop
    0xbfc00008 b 0xbfc00000
    0xbfc0000c nop
    0xbfc00000 lui t0,
               <high 16bits of memory address #1>
    0xbfc00004 nop
    0xbfc00008 b 0xbfc00000
    0xbfc0000c nop
```

This sequence repeats until the second opcode of the spoon-feed sequence is sent.

```
    0xbfc00000 ori t0,
               <low 16bits of memory address #1>
    0xbfc00004 nop
    0xbfc00008 b 0xbfc00000
    0xbfc0000c nop
    0xbfc00000 ori t0,
               <low 16bits of memory address #1>
    0xbfc00004 nop
    0xbfc00008 b 0xbfc00000
    0xbfc0000c nop
```

This sequence repeats until the third opcode of the spoon-feed sequence is sent.

```
    0xbfc00000 lui t1,
               <high 16bits of data word #1>
    0xbfc00004 nop
    0xbfc00008 b 0xbfc00000
    0xbfc0000c nop
    0xbfc00000 lui t1,
               <high 16bits of data word #1>
    0xbfc00004 nop
    0xbfc00008 b 0xbfc00000
    0xbfc0000c nop
```

This sequence repeats until the forth opcode of the spoon-feed sequence is sent.

```
    0xbfc00000 ori t1,
               <low 16bits of data word #1>
    0xbfc00004 nop
    0xbfc00008 b 0xbfc00000
    0xbfc0000c nop
    0xbfc00000 ori t1,
               <low 16bits of data word #1>
    0xbfc00004 nop
    0xbfc00008 b 0xbfc00000
    0xbfc0000c nop
```

This sequence repeats until the fifth opcode of the spoon-feed sequence is sent.

```
    0xbfc00000 sw t1, 0(t0)
    0xbfc00004 nop
    0xbfc00008 b 0xbfc00000
    0xbfc0000c nop
    0xbfc00000 sw t1, 0(to)
    0xbfc00004 nop
    0xbfc00008 b 0xbfc00000
    0xbfc0000c nop
```

This sequence repeats until the next opcode of the spoon-feed sequence is sent.

In the above, the lui opcode loads the upper 16 bits of the specified register with data from the IMMD field of the opcode. The IMMD field is part of a MIPs R4400 opcode that is used in instructions such as lui and ori as a 16-bit literal data value. In the case of the lui opcode, the 16-bits in the IMMD field are written to the upper 16-bits of the register specified by the instruction. The ori opcode performs a "bitwise logical or" function with the contents of the specified register and the data from the IMMD field of the opcode. The results of this function are stored in the register. Since the immediate data is "right justified," only the lower 16 bits of the register will be modified. The sw opcode writes the contents of the first register to the address formed by adding the immediate offset value to the second register. In the example immediately above, t1 is written to location 0+t0.

Thus, by using the software loop of the present invention, the initialization software is stored in one place for use by many CPUs without having to extend the memory data path beyond the CPU, and the software does not have to be updated multiple times. The present invention provides a mechanism for initialization which pushes data and software code from a service processor to another processor so that an additional memory area is not needed for the initialization process.

While a full and complete disclosure of the invention has been made, it will become apparent to those skilled in this art that various alternatives and modifications can be made to various aspects of the invention without departing from the true scope of the claims which follow.

What is claimed is:

1. A method for initial execution of a software program by a processor in a multiprocessor system, said multiprocessor system including registers, said method comprising the steps of:

loading said registers with a sequence of software code;

implementing a first instruction loop with said sequence of software code, said first instruction loop capable of being executed for an indefinite length of time, said first instruction loop capable of executing at least one software instruction on a periodic basis;

releasing said processor from a reset state;

executing said first instruction loop; and modifying said first instruction loop to a second instruction loop, said second instruction loop having at least one different instruction from said first instruction loop;

whereby said processor in said system of multiple processors is initialized.

2. The method for initial execution of a software program by a processor in a multiprocessor system of claim 1, wherein said first instruction loop is contained in said registers, and said registers are implemented at a reset vector location of said processor.

3. The method for initial execution of a software program by a processor in a multiprocessor system of claim 1, wherein said processor executes said first instruction loop multiple times before an external processor modifies said first instruction loop into said second instruction loop.

4. The method for initial execution of a software program by a processor in a multiprocessor system of claim 1, wherein instructions contained in said first instruction loop are limited to instructions producing a same result regardless of execution times.

5. The method for initial execution of a software program by a processor in a multiprocessor system of claim 1, further comprising the step of placing a branch instruction in said second instruction loop to transfer control from said second instruction loop to a loaded code image.

6. A multiprocessing system comprising:

a register;

a sequence of software code for implementing a first instruction loop in said register, said first instruction loop capable of being executed for an indefinite length of time, and said first instruction loop capable of executing at least one software instruction on a periodic basis;

a first processor for executing said first instruction loop; and a second processor for modifying said first instruction loop to a second instruction loop, said second instruction loop having at least one different instruction from said first instruction loop;

whereby said first processor is initialized.

7. The multiprocessing system of claim 6, wherein instructions contained in said first instruction loop are limited to instructions producing a same result regardless of execution times.

8. The multiprocessing system of claim 6, wherein said first instruction loop is contained in said register, and said register is implemented at a reset vector location of said first processor.

9. The multiprocessing system of claim 6, wherein said first processor executes said first instruction loop multiple times before said second processor modifies said first instruction loop into said second instruction loop.

10. The multiprocessing system of claim 8, wherein said second processor modifies said first instruction loop into said second instruction loop by changing at least one opcode in said reset vector location.

11. The multiprocessing system of claim 6, wherein said second processor modifies said first instruction loop into said second instruction loop by changing one instruction in said first instruction loop.

12. The multiprocessing system of claim 6, wherein said register is located in a memory controller.

* * * * *